June 25, 1935.  A. T. HARRIS  2,005,740
POWER TRANSMISSION DEVICE
Filed Feb. 19, 1934   4 Sheets-Sheet 4
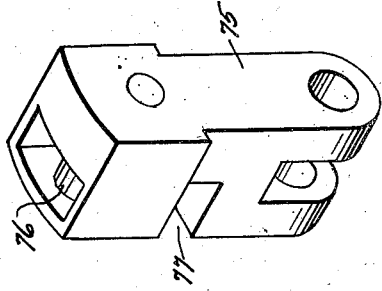
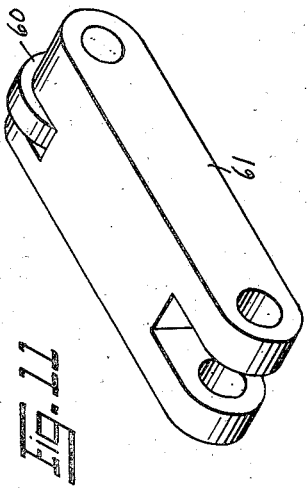
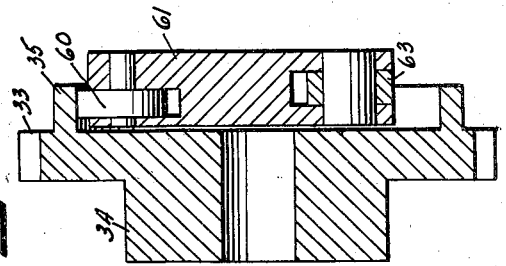
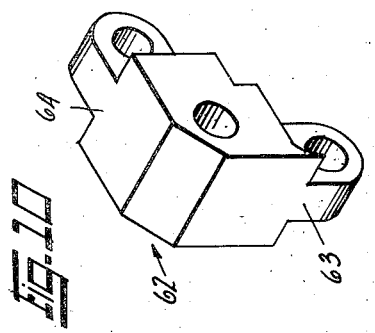
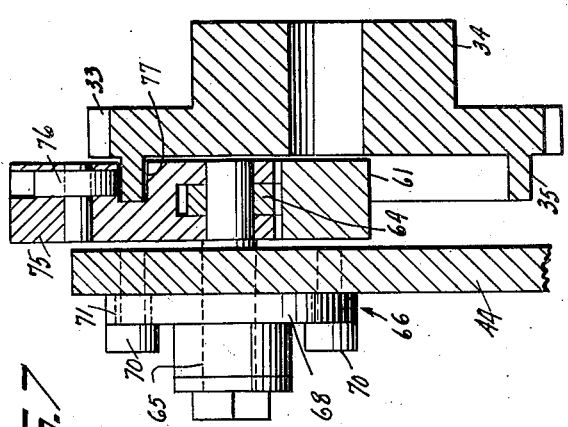
INVENTOR
Albert T. Harris
BY
ATTORNEY Patented June 25, 1935

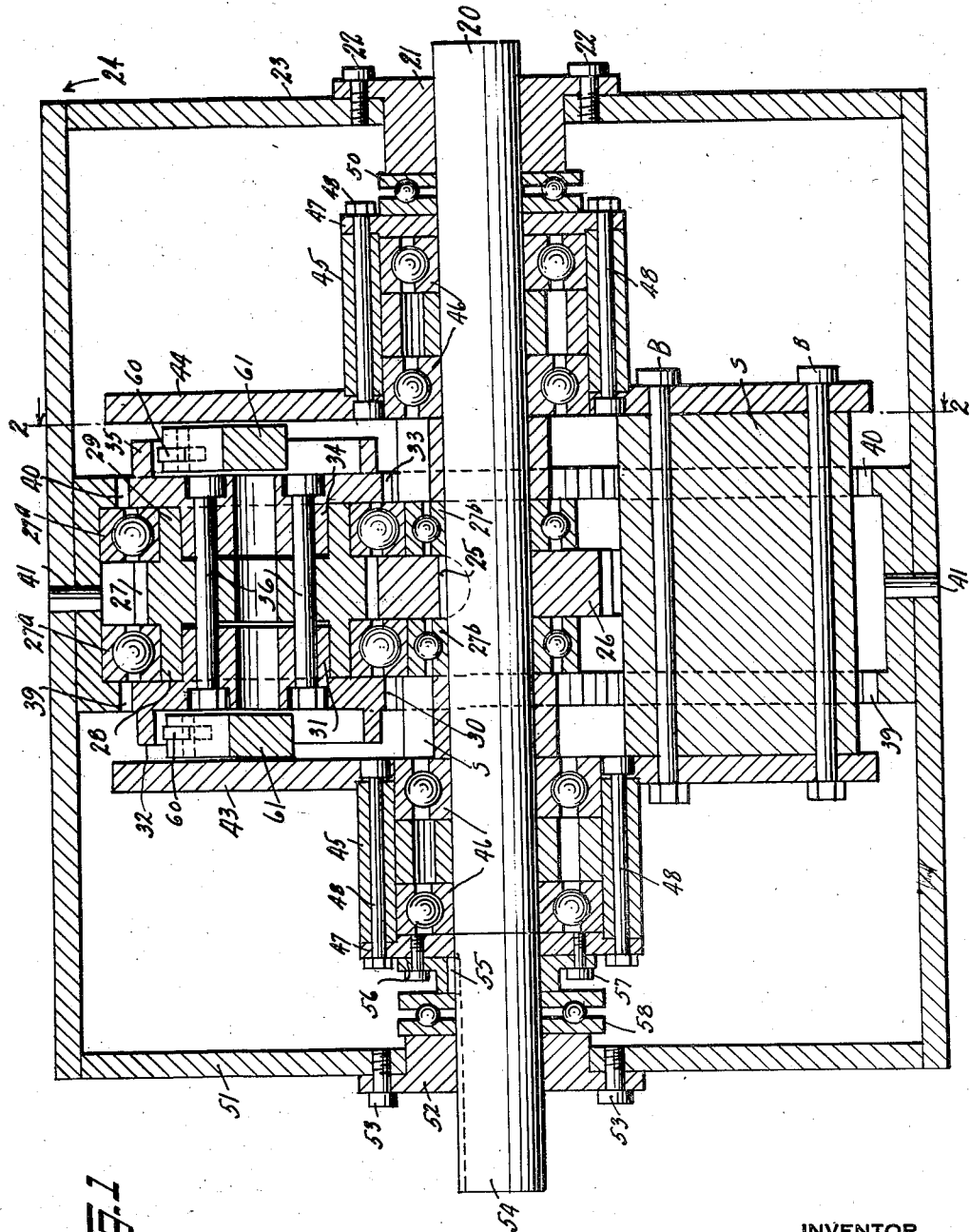

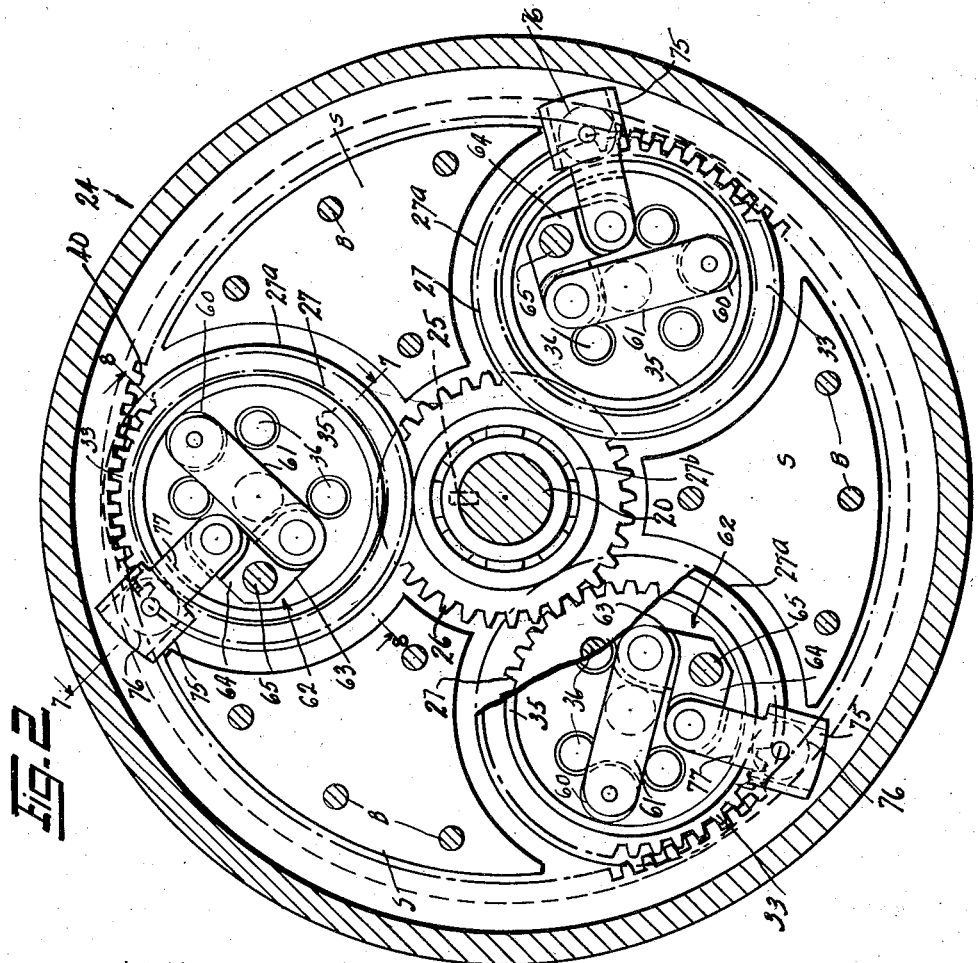

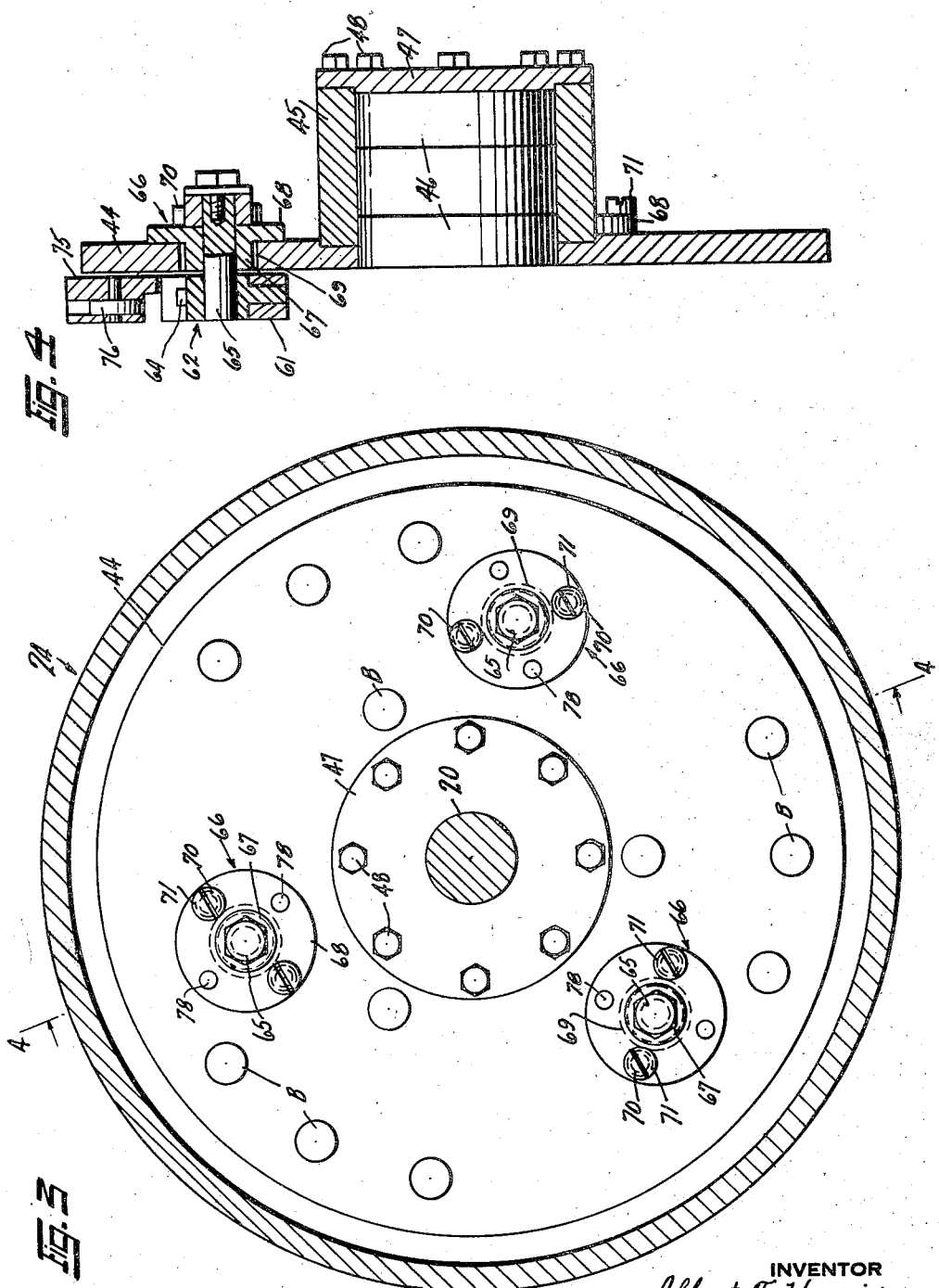

2,005,740

UNITED STATES PATENT OFFICE 2,005,740

POWER TRANSMISSION DEVICE

Albert T. Harris, New York, N. Y., assignor, by mesne assignments, to A. T. Harris Holding Corporation, a corporation of New York Application February 19, 1934, Serial No. 711,902

12 Claims. (Cl. 74—305)

This invention relates to power transmission devices adapted to be coupled to machines of various kinds, and has for one of its objects the provision of a device of this character which will deliver at its output a greater power than that delivered by transmission devices now commonly used.

Another object of the invention is to provide a device of this nature having a power receiving shaft which carries a central or sun gear in mesh with a plurality of planetary gear structures from which power is taken off at such points and at such angles that will increase the torque of the device.

A further object of the invention is to produce a device of this nature that is easily assembled and disassembled.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a longitudinal sectional view taken on the center line of my improved transmission device.

Figure 2 is a sectional view taken on line 2—2 Fig. 1 with some parts broken away.

Figure 3 is an end view thereof looking from the right of Fig. 1 with the end wall removed.

Figure 4 is a sectional view through the right hand web plate and taken on line 4—4 Fig. 3.

Figure 5 is a side view of one of the planetary gear structures.

Figure 6 is a longitudinal sectional view thereof.

Figure 7 is a fragmental sectional view taken on line 7—7 Fig. 2 and showing the outer power take off means.

Figure 8 is a similar view showing the inner power take-off means and taken on line 8—8 Fig. 2.

Figure 9 is a perspective view of the outer power take off block.

Figure 10 is a perspective view of the power take off bell crank and

Figure 11 is a perspective view of the inner power take off roller link.

Referring now to the drawings in detail 20 indicates the power receiving shaft which may be suitably secured or coupled to any power or generating machine or device and which is mounted near one end thereof in a bearing 21 secured by bolts 22 to one end wall 23 of a casing or drum 24. Secured to the said shaft 20 by means of a key 25 is a central or sun gear 26 in mesh with three central planetary gears 27 each provided with outwardly extending flanges or circular walls 28 and 29. Housed within the wall or flange 28 is a boss or shoulder 31 forming a part of a planetary gear 30 which at its outer end is provided with a circular flange 32. A planetary gear 33 having a boss 34 and a circular flange 35 is similarly supported in the flange 29 of the gear 27. The said gears 27, 30 and 33 are bolted together by means of bolts 36 to form a single unit. The planetary gears 30 and 33 are in mesh with internal or ring gears 39 and 40 respectively, the said ring gears being of unitary construction and secured to the drum 24 by pins or bolts 41 (see Fig. 1). The gears 27 are provided with ball bearings 27a and the shaft 20 with ball bearings 27b.

A pair of webs or plates 43 and 44 are provided one at each end of the planetary gear construction and they are each provided with a cylindrical hollow hub 45 in which there are housed pairs of ball bearings 46. The said hollow hubs are closed by end plates 47 which are secured to the said hubs by means of bolts 48 which pass through the web plates, hubs and end plates. Interposed between the bearing 21 and right hand plate 47 is an end thrust ball bearing 50. (See Fig. 1.) The web plates are connected to each other by bolts B which pass through the said plates and spacer blocks S.

The left end of the drum 24 is closed by an end wall 51 and is provided with a central bearing 52 secured thereto by bolts 53. Rotatably mounted within the said bearing 52 is a short shaft 54 which is keyed by means of a key 55 to a coupling plate 56 secured to the left end plate 47 by means of screws or bolts 57. A thrust bearing 58 is interposed between the bearing 52 and the coupling plate 56.

It will be seen by referring to Figs. 1 and 2 that the planetary gears 27, 30 and 33 are not centered or mounted upon any studs or shafts but are respectively maintained in proper mesh with the sun gear 26 and ring gears 39 and 40, by the outer casings of the ball bearings 27a and 27b.

In contact with the inner surface of the circular flanges or walls 32 and 35 of the planetary gears 30 and 33 are rollers 60 one for each flange of each gear. The rollers 60 are carried at one end of levers or blocks 61 disposed at an angle of approximately 45 degrees in one direction to a line, running from the center of the sun gear to the center of the planetary gear structures. The opposite ends of the said levers are each secured to a bell crank lever 62 having equal arms 63 and 64 and mounted on a pin, 65. The said pins 65 (see Figs. 2, 3, 4 and 7) pass through a flanged bushing 66 each comprising a hub 67 and a flange 68. As will be seen the hubs 67 are of somewhat smaller diameter than holes 69 in the web plates. The bushings 66 are secured to the web plates by screws 70 of somewhat smaller diameter than the holes 71 in the flanges.

Secured to the arms 64 of the bell cranks 62 are bifurcated links or blocks 75 which are provided with rollers 76 bearing on or in contact with the outer surface of the flanges 32 and 35, the said blocks being provided with cutouts 77 to clear the said walls or flanges 32 and 35. The said blocks 75 are disposed at approximately 90 degrees to the levers or links 61 or at approximately 45 degrees to the opposite side of the gear center line. The arms 63 and 64 of the bell crank 62 are disposed at right angles to each other. Due to the clearance between the bushing body 67 and hole 69 as well as the clearance between the screws 70 and the holes 71, the rollers 60 and 76 can be brought into proper engagement with the gear flanges and maintained in said position by dowel pins 78 which are driven home after the said adjustment is made. The rollers are mounted in push or pull rods, which are attached to bell crank levers, the latter being supplied with a driving pin and adjusted in webb plates, the push or pull rods and bell crank levers being of such length when properly adjusted to the web plates that a true radial force will be forwarded from the gear flanges upon said rollers, and in turn delivered upon the web plates at a radial point, true with the line of action.

The operation of the device is as follows:

Power is applied from a motor or other power generating device to the shaft 20 and sun gear 26 which gear transmits power and motion to the central planetary gears 27 and thence to the end planetary gears 30 and 33 whose teeth being in mesh with the ring gears 39 and 40 cause the said planetary gears to travel in the direction of rotation of the sun gear. The power applied to the planetary gears is transferred through the rollers 60 and 76, link 61, block 75 and bell crank 62 to the pin 65 and thence to the webs or plates 43 and 44 through the adjusting bushings 66. The delivery shaft 54 is rotated in the same direction as the power shaft 20 through its connections 55 and 56 at a reduced rate of speed but at a greater power. However, this shaft can be coupled to any machine by suitable gearing to drive the said machine at a further reduced or increased speed.

It will be seen that due to the right angular relation of the power transmitting or take-off rollers 60 and 76 and the position of the power transmitting pin 65 and its connection with the link 61 and block 75 through the equal armed bell crank 64, the said pin is forced to rotate in a true circular path, the direction of push upon the said pin being inwardly and downwardly by the link 61, and upwardly and outwardly by the block 75.

I have found that with the arrangement of the parts as above described, that is with the planetary gears unmounted and floating, and by taking off and receiving the forwarding power from outside or beyond the centre of the said planetary gears, through the rollers 60 and 76, makes the resultant power greater than that obtained by the use of centered or mounted gears.

While I have shown and described the power take off rollers and levers in what I believe the most effective angular relation I do not limit myself to this exact relation but desire to include any power take off means in which the effective working parts of the said means are offset at any angle to a center line passing through the planetary gear and sun gear, and positioned at any radial distance from the center of the planetary gear.

It will therefore be seen from the foregoing description that I have provided a highly efficient transmitting device adapted to be used wherever power is to be transmitted or generated.

Having described my invention, what I claim as new and desire to secure by Letters Patent is:

1. A power transmitting device comprising a power shaft, a unit driven by the power shaft, the said unit including a sun gear on the power shaft, a central floating planetary gear arranged in mesh with the sun gear, end planetary gears carried by the central planetary gear, a stationary ring gear in mesh with the end planetary gears, rotatable plates, power take-off means in operative engagement with the said end planetary gears at a portion of each of said end gears that is offset from the planet axes of said end gears, said power take off means being in operative engagement with said rotatable plates, and a delivery shaft operatively coupled to the said rotatable plate.

2. A power transmitting device comprising a power shaft, a unit driven by the power shaft, the said unit including a sun gear on the power shaft, a stationary ring gear, three floating planetary gear structures each comprising a central gear in mesh with the sun gear, end gears in mesh with the ring gear, a pair of rotatable plates, power transmitting means operatively associated with the said planetary gear structures at a portion of each of said end gears that is offset from the planet axes of said floating gears, said power transmitting means being in operative engagement with said rotatable plates, and a delivery shaft operatively coupled to the said rotatable plates.

3. A power transmitting device comprising a power shaft, a unit driven by the power shaft, the said unit including a sun gear on the shaft, a stationary ring gear, a planetary gear in mesh with the sun gear, a second planetary gear carried by the first mentioned planetary gear in mesh with the ring gear, a circular wall on the said second mentioned planetary gear, a pair of links angularly disposed to each other, a roller carried by each of the said links, one of the said rollers being in engagement with the outer surface of the said circular wall and the other roller in engagement with the inner surface of same, a bell crank lever connecting the said links, a plate rotatable about the shaft, means extending from the bell crank lever and operatively connected to the plate, and a delivery shaft driven by the said plate.

4. A power transmitting device comprising a power shaft, a unit driven by the power shaft, the said unit including a sun gear on the power shaft, a stationary ring gear, three planetary gear structures each comprising a central gear in mesh with the sun gear, end planetary gears in mesh with the ring gear, a pair of rotatable plates, outwardly extending circular flanges on the end planetary gears, a roller in engagement with the inner surface of each of the flanges, like rollers in engagement with the outer surface of the said flanges but out of angular alinement with the first mentioned roller, a link for each of the rollers, a bell crank lever connected to the said links, pins carried by the said bell crank levers in operative engagement with the rotatable plates, and a delivery shaft driven by the said plates.

5. A power transmitting device comprising a power shaft, a unit driven by the power shaft, the said unit including a sun gear on the shaft, a stationary ring gear, a planetary gear in mesh with the sun gear, a second planetary gear carried by the first mentioned planetary gear in mesh with the ring gear, a circular wall on the said second mentioned planetary gear, a pair of links disposed at approximately right angles to each other, a roller carried at the outer end of each link, one of the said rollers being in engagement with the inner surface of the circular wall and the other with the outer surface thereof, an equal armed bell crank lever connecting the other ends of the said links, a plate rotatable about the power shaft, a pin centrally located on the said bell crank lever in operative engagement with the said plate, and a delivery shaft driven by the said plate.

6. A power transmitting device comprising a power shaft, a unit driven by the power shaft, the said unit including a sun gear, floating planetary gears, rotary means, a multiple element power take off means in operative relation to the said gears and rotary means, the elements of the said take off means for each planetary gear being angularly disposed with respect to each other, and an element driven by the said rotary means.

7. A power transmitting device comprising a power shaft, a unit driven by the power shaft, the said unit including a sun gear on the power shaft, a central floating planetary gear arranged in mesh with the sun gear, end planetary gears carried by the central planetary gear, a stationary ring gear in mesh with the end planetary gears, a power take off zone carried by the said end gears, the said zone being located outside the center of said planetary gears, power take off means in operative engagement with the said zones disposed at any angle thereto from zero degrees to three hundred and sixty, rotatable means driven by the said take off means and an element operatively coupled to the said rotatable means.

8. A power transmitting device comprising a power shaft, a unit driven by the power shaft, the said unit including a sun gear on the power shaft, a central floating planetary gear arranged in mesh with the sun gear, end planetary gears carried by the central planetary gear, a stationary ring gear in mesh with the end planetary gears, power take-off flanges carried by the said end gears, and power take off means in operative engagement with the said flanges disposed at any angle thereto from zero degrees to three hundred and sixty, and at any distance from the center of the said planetary gear.

9. A power transmitting device comprising a power shaft, a driven shaft, and a unit driven by the power shaft, the said unit including a sun gear on the power shaft, a carrier and a floating planet gear driven by the sun gear, the said planet gear being provided with means extending circumferentially thereof from which power may be taken off, and links and rollers operatively associated with said first mentioned means and connected to said carrier for transmitting power to the driven shaft.

10. A power transmitting device comprising a power shaft, a driven shaft, and a unit driven by the power shaft, the said unit including a sun gear on the power shaft, a carrier and a floating planet gear driven by the sun gear, a laterally extending circumferential flange formed on the planet gear from which power may be taken off, a power take-off roller engaging with said flange and a link structure operatively connecting the power take-off roller with the carrier for transmitting power to the driven shaft.

11. A power transmitting device comprising a power shaft, a driven shaft, and a unit driven by the power shaft, the said unit including a sun gear on the power shaft, a carrier and a floating planet gear unit driven by the sun gear, the said planet gear unit being provided with means on each side thereof offset in relation to the axis of the planet gear unit, from which power may be taken off, and power take off means operatively associated with said first mentioned means and connected to said carrier for transmitting power to the driven shaft.

12. A power transmitting device comprising a power shaft, a driven shaft, and a unit driven by the power shaft, the said unit including a sun gear on the power shaft, a carrier and a floating planet gear unit driven by the sun gear, said planet gear unit having portions thereof offset relative to the axis of said planet gear, said portions being symmetrical with respect to the central radial plane of said planet gear unit and from which power may be taken off, and power take off means operatively associated with said portions and connected to said carrier for transmitting power to the driven shaft.

ALBERT T. HARRIS.